United States Patent [19]

Cox et al.

[11] Patent Number: 5,378,260

[45] Date of Patent: Jan. 3, 1995

[54] TWO-ZONE COUNTERCURRENT SMELTER SYSTEM AND PROCESS

[75] Inventors: James H. Cox, Toronto, Canada; Richard J. Fruehan, Murrysville, Pa.; John F. Elliott, deceased, late of Winchester, Mass., by Frances P. Elliott, executrix

[73] Assignee: The United States of America as represented by the Department of Energy, Washington, D.C.

[21] Appl. No.: 736,626

[22] Filed: Jul. 26, 1991

[51] Int. Cl.[6] .................................. C21B 13/10
[52] U.S. Cl. ....................... 75/500; 75/502; 266/162; 266/177; 266/193
[58] Field of Search .............. 75/500, 501, 502, 957; 266/162, 177, 193

[56] References Cited

U.S. PATENT DOCUMENTS

| | | |
|---|---|---|
| 714,449 | 11/1902 | Carson . |
| 714,451 | 11/1902 | Carson . |
| 1,300,410 | 4/1919 | Johnson . |
| 1,886,937 | 11/1932 | Brett . |
| 1,992,084 | 2/1935 | McGregor ................ 75/62 |
| 2,557,651 | 6/1951 | Gilliland ................. 266/24 |
| 2,740,710 | 4/1956 | Johannsen . |
| 2,758,022 | 8/1956 | Jordan .................... 75/76 |
| 3,022,157 | 2/1962 | Huntington .............. 75/30 |
| 3,275,432 | 9/1966 | Alexandrovsky ......... 75/26 |
| 3,326,671 | 6/1067 | Worner . |
| 3,752,663 | 8/1973 | Worner et al. .......... 266/162 |
| 4,358,094 | 11/1982 | Megerle et al. ......... 266/193 |
| 4,358,311 | 11/1982 | Weigel et al. ........... 75/26 |
| 4,362,561 | 12/1982 | Weigel et al. ........... 75/92 |
| 4,798,624 | 1/1989 | Brotzmann et al. ..... 75/38 |
| 4,913,734 | 4/1990 | Romenets et al. ....... 75/501 |

FOREIGN PATENT DOCUMENTS

| | | |
|---|---|---|
| 0266975 | 11/1988 | European Pat. Off. . |
| 368266 | 5/1990 | European Pat. Off. ........ 75/501 |
| WO91/03575 | 3/1991 | European Pat. Off. . |
| 1405775 | 11/1965 | France . |

OTHER PUBLICATIONS

Queneau/The QSL Reactor for Lead and iIts Prospects for Ni, Cu and Fe,/Jom pp. 30–35, Dec. 1989.

Ibaraki et al. 49th Ironmaking Conference Proceedings/pp. 631–638/Mar. 1990/ Detroit.

Queneau, Paul, *Direct Steelmaking-Quo Modo?*, Iron and Steelmaker (Dec. 1990) at 76.

Fukuzawa, Akira, *Continuous Steelmaking Process: Research and Future*, 27 Transactions of National Research Institute for Metals 81 (1985).

Ibaraki, Tetsuharu, et al., *Development of Smelting Reduction of Iron Ore-An Approach to Commercial Ironmaking*, 49th Ironmaking Conference Proceedings, Detroit (Mar. 1990).

Falcon Foundry Co., *Copper Water Cooled Panels for Electric Furnaces*, Metal Producing, vol. 29, (Mar. 1991) at 67.

*Primary Examiner*—Melvyn J. Andrews
*Attorney, Agent, or Firm*—Tyrone Davis; Hugh W. Glenn; William R. Moser

[57] ABSTRACT

A process for continuously smelting iron ore by use of coal to yield molten iron or semi-steel is disclosed. The process comprises the steps of establishing a melt covered by slag; inducing the slag and the molten iron to flow countercurrently to one another, toward opposite ends of the smelter; maintaining iron oxide-reducing conditions in that zone of the smelter towards which the slag flows; maintaining carbon-oxidizing conditions in that zone of the smelter towards which the molten iron flows; continuously or semicontinuously tapping the slag from the reducing zone end of the smelter; continuously or semicontinuously tapping the molten iron from the oxidizing zone end of the smelter; and adding to both zones iron ore, coal, oxygen, and flux at addition rates sufficient to keep the molten iron in the reducing zone substantially saturated with carbon, maintain in the slag being tapped an FeO content of about 5 weight percent or less, and maintain in the molten iron being tapped a carbon content of about 0.5 to 5 weight percent. A slag dam preferably is included in the smelter, to impede the backflow of the slag from the reducing zone to the oxidizing zone. A metal bath dam with one or more flow-through portals also is preferably used, submerged below the slag dam, to impede the backflow of the hot metal.

15 Claims, 8 Drawing Sheets

TWO-ZONE COUNTERCURRENT SMELTER SYSTEM AND PROCESS

This invention was made with U.S. Government support under Cooperative Agreement No. DE-FC07-89ID12847 with the Department of Energy. The Government has certain rights in this invention.

BACKGROUND OF THE INVENTION

1. Technical Field of Invention

The present invention pertains to the fields of metallurgy and metallurgical apparatus. More particularly, this invention concerns a specialized metallurgical process for ironmaking and steelmaking and a means for smelting ore and treating liquefied metal.

2. Description of the Background Art

The history of steelmaking is largely the history of batch processes that employ a single zone for oxidizing and reducing the metal. See, e.g., 21 Kirk-Othmer, "Steel," *Encyclopedia of Chemical Technology* 552 (3rd ed. 1978). Since the Bessemer process was introduced in the mid-1800s, such batch processes have been greatly improved. Nonetheless, significant limitations linger, not the least of which is the limited production rate of batch processes.

To overcome the limitations of batch processes, the steel industry has long tried to develop a continuous steelmaking process. In the 1960s and 1970s many continuous processes were investigated, and an overview of this research and several more recent studies can be found in Akira Fukuzawa, "Continuous Steelmaking Process: Research and Future," 22 *Bull. Japan Inst. Metals* 855-861 (1983); the English translation may be found in 27 *Transaction of National Research Institute for Metals* 81 (1985) However, serious problems remain unsolved, due in part to the co-occurrence of reduction and combustion reactions in the same furnace. See, e.g., T. Ibaraki, et al., "Development of Smelting Reduction of Iron Ore—An Approach to Commercial Ironmaking," 49th *Ironmaking Conference Proceedings*, Detroit (March 1990). More recently, Paul E. Queneau, "The QSL Reactor for Lead and Its Prospects for Ni, Cu, and Fe," 30 JOM (Dec. 1989), proposed a horizontal smelter for continuous steelmaking (in FIG. 9 and related text) but noted that there could be operating problems relating to kinetics. With reference to the hypothesized system, the article speculates at page 35 that: "Its ironmaking capacity obviously would not compete with the mighty blast furnace . . . but it could be at least adequate for mini-mills." Despite the decades of research and the Queneau proposal, the steelmaking industry has failed to produce a viable means for continuous ironmaking and steelmaking.

SUMMARY OF THE INVENTION

It is an object of the present invention to provide a method and apparatus for smelting iron ore having greater hot metal productivity than single-zone processes.

It is another object of the present invention to provide a method and apparatus for smelting iron ore having better heat transfer characteristics than a single-zone smelter.

It is yet another object of the present invention to provide a method and apparatus for efficiently producing liquid iron.

It is still another object of the present invention to provide a method and apparatus for smelting iron ore capable of producing an oxidizing environment with a higher FeO content in the slag than normally found in a single-zone smelter, and thereby increasing the reduction or production rate.

These and other objects are achieved by means of a two-zone countercurrent smelter in which oxygen, iron ore, flux, and coal are added to both zones, such that there is no need for heat transfer across the zones. The reducing zone is maintained under conditions more conducive to the reduction of iron oxide than are the conditions present elsewhere in the smelter. Conditions maintained in the oxidizing zone are more conducive to the oxidation of carbon than are the conditions maintained in the reducing zone. Slag moves across the smelter in a direction opposite to the direction that the molten metal is moving (i.e., countercurrent). Slag in the oxidizing zone has a higher FeO content (about 15-20%) than the reducing zone (about 5% at most). (Unless otherwise indicated, all percentages herein are by weight.) As the slag flows from the oxidizing zone to the reducing zone, the FeO is reduced out of the slag, and the slag is tapped at about 5% FeO or less. Therefore, there is no high FeO content in the tapped slag to decrease yield. In the reducing zone there is excess coal in the slag to permit fast reactions, and the metal is carbon saturated. As the metal flows from the reducing zone to the oxidizing zone, its carbon content decreases to about 1-2%, and the metal is tapped out of the oxidizing zone. The process is run substantially continuously or semicontinuously. An Energy Materials-Kinetic model of the process suggests that the reduction (or production) rate may be 100% (or more) faster than for a single-zone smelter of a similar size.

DETAILED DESCRIPTION OF A PREFERRED EMBODIMENT

Figure 1:
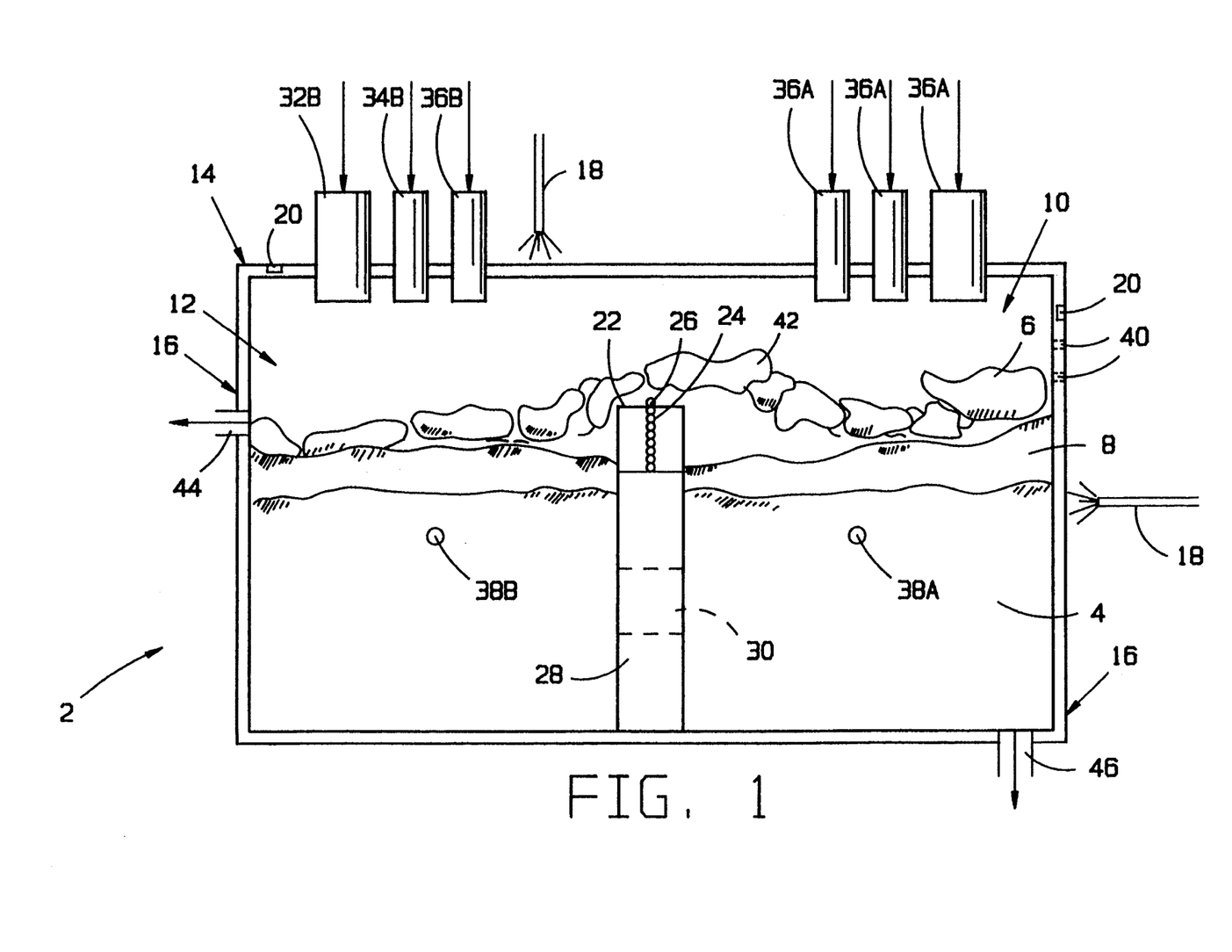
FIG. 1 is a schematic representation of a two-zone countercurrent smelter of the present invention.

FIG. 1 shows a diagram of the two-zone countercurrent smelter engaged in a process for continuous steelmaking. Horizontal smelter 2 contains metal 4, slag 6, and a slag-metal emulsion 8 in two zones: an oxidizing zone 10 and a reducing zone 12. Internally, smelter 2 can be approximately twenty feet long, ninety inches wide, and ten feet high.

Smelter 2 has a roof 14 and walls 16, both of which are made of refractory materials cooled by a water sprayer system 18. In addition, the roof 14 and walls 16 have copper coolers 20 to help smelter 2 withstand the heat and any short-term water failure that might occur. Copper coolers 20 are water-cooled fingers or plates, sized about four inches by twenty-seven inches, that extend about eighteen inches into the refractory materials of the roof 14 and walls 16. The copper coolers 20 can be located on one to two foot centers, spaced closer in high wear areas.

A slag dam 22 is located approximately halfway along the length of smelter 2, to partially separate zones 10 and 12. The slag dam 22 is located above and out of metal 4 and is configured to impede the backflow of slag 6 from the reducing zone 12 to the oxidizing zone 10, while permitting the net rate of flow of the slag from the oxidizing zone 10 to the reducing zone 12 to substantially equal the net rate of slag production in the oxidizing zone. In one embodiment (not shown in FIG. 1), slag dam 22 has one or more portals through which the slag 6 can flow from zone 10 to zone 12. Optionally, a portal system can also be added to slag dam 22 to allow some of the slag 6 and the slag-metal emulsion 8 to flow from the reducing zone 12 back into the oxidizing zone 10. This backflow recycles some of the slag 6, though there still is a net movement of slag 6 to the reducing zone 12.

FIG. 1, though, shows an embodiment of the invention having the slag dam 22 operate without portals for recycling. In this embodiment, slag dam 22 has a height limited to allow the slag 6 to overflow the slag dam 22. For the smelter 2 having the above-specified dimensions, the slag dam 22 can be a copper slab approximately ten feet long, ten inches wide, and three feet high. The bottom of slag dam 22 is located about six to eight inches above the maximum height of the metal 4.

To keep the temperature of the exterior of slag dam 22 under 750° C., the interior has full-length cooling channels 24. It is possible to cool slag dam 22 with high velocity air containing water mist, but water cooling is preferred. Loss of the water mist content in the air would subject slag dam 22 to overheating within minutes. Thus, the reliability of any means for mist generation and injection into the air would be critical.

It is also possible to use an organic heat transfer liquid, e.g., hot-Dowtherm, instead of water in the channels. Use of such requires an oil/water heat exchanger in the coolant circuit for removing the heat.

Another approach is to have the cooling channels 24 partially filled with water. Heat can then be removed by vaporization of the water, with the steam being condensed in a cooled zone external to smelter 2. The condensed water is conveyed back into the cooling channels 24 to complete the cooling cycle.

However, thermal protection is best achieved with water-cooling, for example, by coursing 320 USGPM of water through eight cooling channels 24, each channel having a two-inch diameter. This protection provides relatively cool temperatures which have the following benefits: (1) a relatively thicker protective layer of frozen slag forms on the slag dam 22, (2) smaller temperature gradients occur in the copper of the slag dam 22 (which reduce thermal stresses), and (3) smaller temperature fluctuations occur when heating and cooling the smelter 2 (which reduces the chance of failure due to thermal fatigue). Water-cooling can also provide protection against hazards such as a short-term interruption of the cooling due to a power outage or a pump failure. For example, a head tank (not shown in FIG. 1) can be used to maintain a minimum water flow for a time sufficient to drain and cool the smelter 2.

Additional features should be employed in constructing slag dam 22 to minimize the risk of failure. First, the water channels 24 should be drilled through chill-case copper billet that is pipe-free. Second, a complete X-ray examination of the slag dam 22 should be used to verify its integrity. Third, machined grooves (not shown in FIG. 1) should be placed on the surface of the slag dam 22 to help secure accretion build-up, thereby insulating the slag dam 22 from the heat of smelter 2. Fourth, thermocouples 26 should be installed along the length of slag dam 22 to detect any overheating by continuously monitoring temperatures. Fifth, the flow of both supply and discharge water lines to water channels 24 should be monitored to detect for leakage. With these features, the water-cooled, copper slag dam 22 is the best approach for the specified dimensions and heat loads of smelter 2.

A metal bath dam 28 is located under slag dam 22 in the smelter 2 to impede the backflow of metal from oxidizing zone 10 to reducing zone 12, while permitting the net rate of flow of the hot metal from the reducing zone to the oxidizing zone to substantially equal the net rate of hot metal production in the reducing zone. The metal flows through at least one opening 30 in dam 28. The metal bath dam 28 is a precast refractory underflow or throughflow dam that is held in place partially by the lower brickwork of smelter 2 and partially by the weight of slag dam 22. For the smelter 2 having the above-mentioned dimensions, the metal bath dam 30 can be about nine inches thick and about three feet high, extending upwards from the bottom (and across the width) of the smelter 2.

Smelter 2 has ports 32A and 32B that are used when adding certain steelmaking process ingredients to the oxidizing zone 10 and the reducing zone 12. Similarly, there are two pneumatic injection ports 34A and 34B and two oxygen lance ports 36A and 36B—all to add steelmaking process ingredients into smelter 2.

In addition, there are at least two tuyeres 38A and 38B in the walls 16 to inject inert gas or oxygen (not shown) into the molten metal 4 to cause a turbulent intermixing of the slag 6 and metal 4. Simultaneously, steelmaking process ingredients are added via ports 32, pneumatic injection ports 34, and oxygen lance ports 36. The injection of inert gas enhances the exchange of heat and chemical species between the slag and metal. Heat and mass transfers between the metal 4 and the slag 6 in both zones 10 and 12 of the smelter 2 are thereby promoted by this means for generating the active slag-metal emulsion 8.

FIG. 1 shows a slag tap hole 44 in the reducing zone 12, from which slag 6 can be withdrawn continuously from smelter 2. Also shown, at a lower elevation than the slag tap hole, is a liquid steel tap hole 46 in the oxidizing zone 10, which permits metal 4 to be withdrawn continuously from the smelter 2. The hot metal tap hole can be located either in the end wall of the oxidizing zone, near the bottom of the smelter, or, as shown in FIG. 1 of the drawings, in the bottom, near the end wall. Gravity alone will induce the necessary flow of the slag in one direction and the flow of the hot metal in the opposite direction. The flow of both can be controlled solely by metering the addition of the steelmaking process ingredients.

A plurality of high velocity gas jets 40 preferably pierce the walls 16 in the oxidizing zone 10 to blow inert gas (not shown) to create a positive, vigorous displacement of slag 6 from the oxidizing zone 10 over the slag dam 22 and into the reducing zone 12. The gas jets 40 are directed at a downward lateral angle, and with sufficient volume and force, to break up some of the slag 6 into a spray 42 in which slag droplets are heated by contact with other hot gases (not shown) in the smelter 2. The spray 42 passes up and over the slag dam 22, where slag 6 collects in the reducing zone 12 until it is tapped.

The steelmaking process ingredients, which are more fully described with reference to FIGS. 4–8, may include iron ore, coal, silica, $O_2$, lime, and $N_2$ (or other inert gas suitable for the process, e.g., argon). The iron ore may be unreduced or partially reduced, and it may be in the form of pellets, fines, or sinter. Typically, the lime (flux) and silica are added to maintain a basicity (ratio of lime to silica) in the range of 0.5 to 3 total. However, the basicity can be separately maintained in each of zones 10 and 12. Similarly, both zones 10 and 12 can be fed with the steelmaking process ingredients, or concentrated oxide materials can be added to the oxidizing zone 12 while concentrated reducing materials are added to the reducing zone 12.

Figure 2:
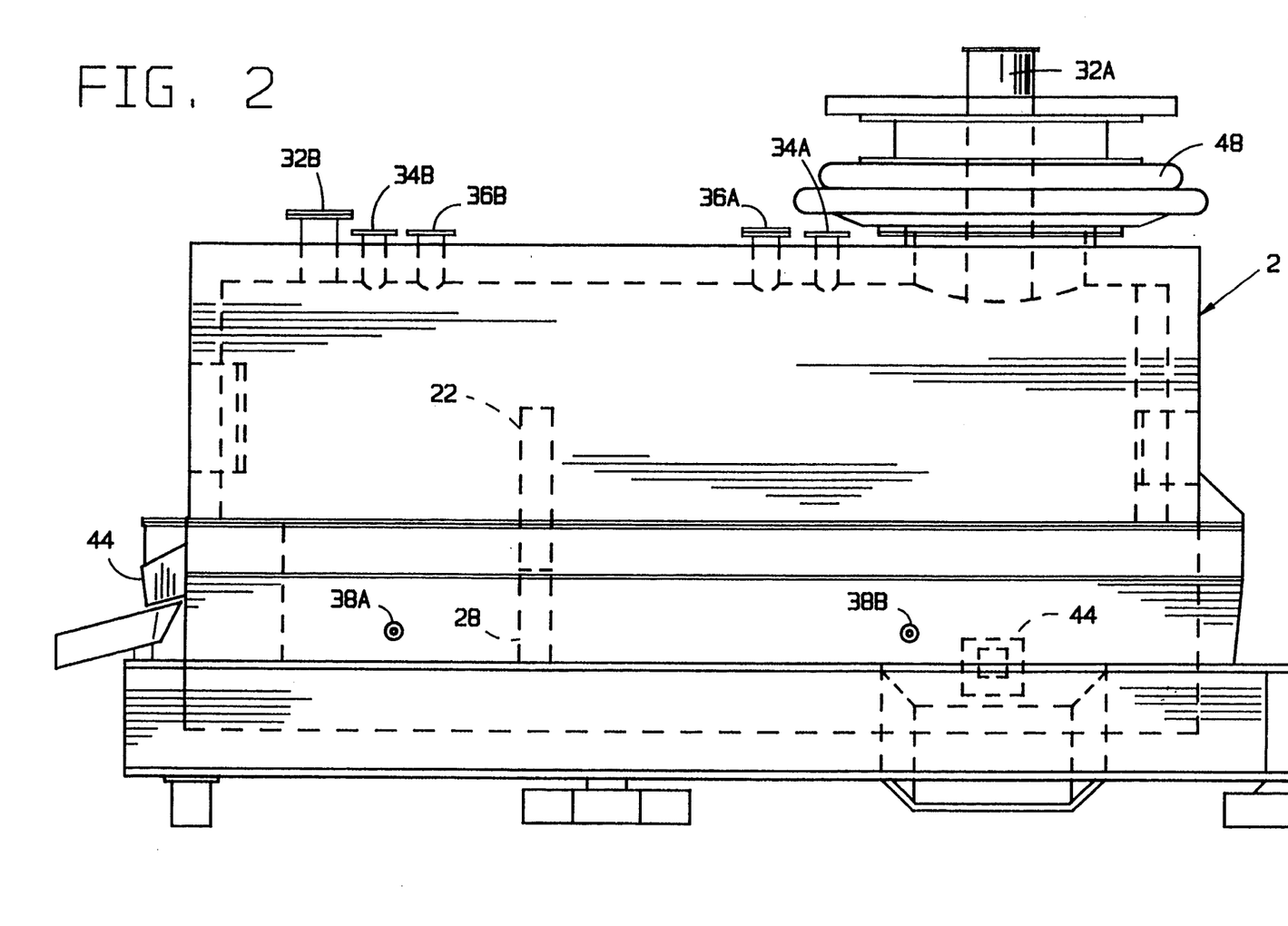
FIG. 2 is a side view of the two-zone countercurrent smelter of the present invention.

FIG. 2 shows a side view of smelter 2. A gas hood 48 is in the "down" position, connecting to an area of the roof 14 of smelter 2 over the oxidizing zone 10. It is to be understood that a similar gas hood (not shown) is extendable to connect to an area of roof 14 over the reducing zone 12. Each gas hood 48 surrounds one of the ports 32. Each of the ports 32 encloses a lock hopper feed system (not shown) that transports the steelmaking process ingredients to the melt without releasing gases from the smelter. Pneumatic injection ports 34 also can be used to add steelmaking process ingredients to the smelter 2. Oxygen lance ports 36 allow inserted lances to blow pressurized $O_2$ into the smelter 2, and the tuyeres 38 allow inert gas to be injected into the smelter 2. FIG. 2 also shows the location of the slag tap hole 44 and the liquid steel tap hole 46.

Figure 3:
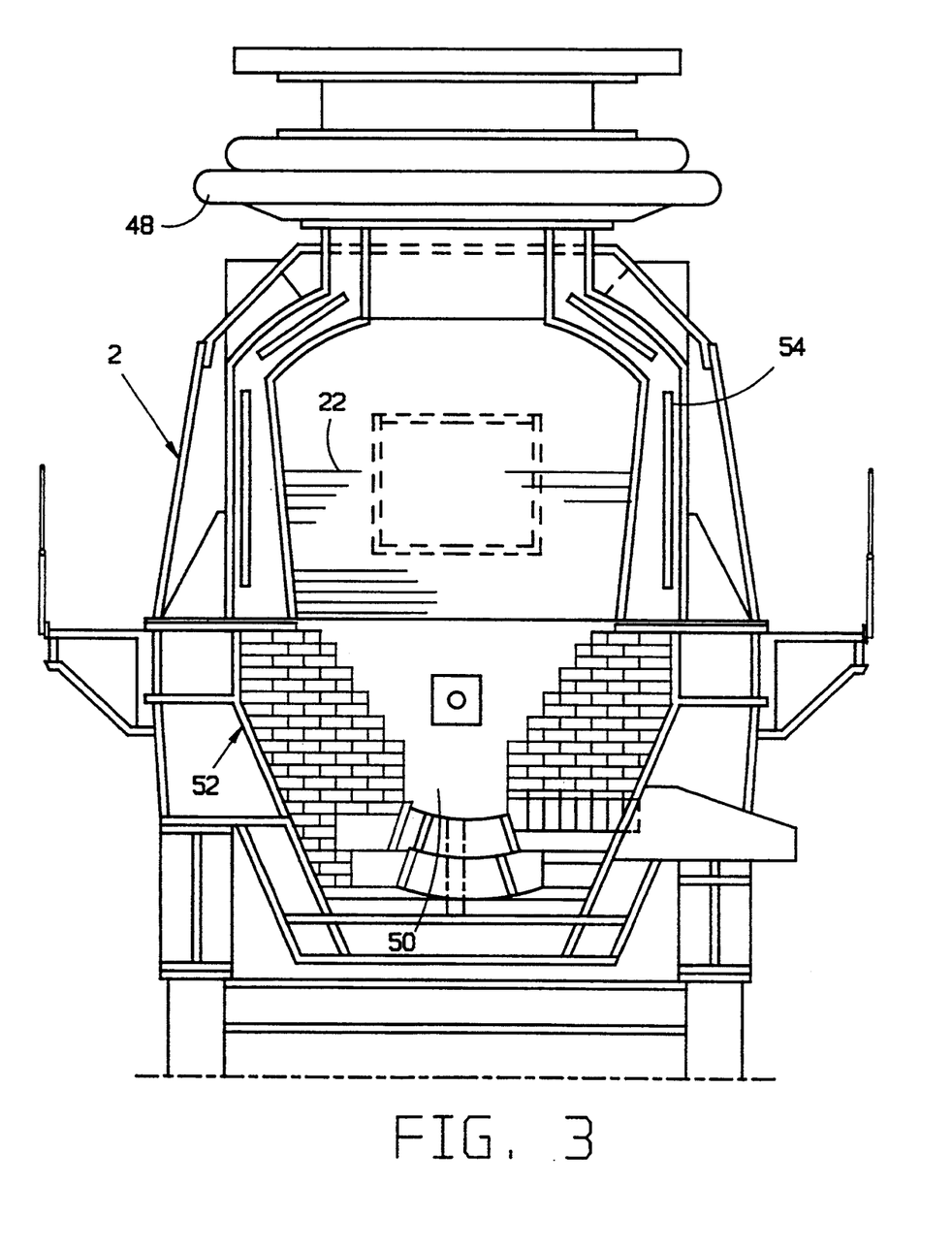
FIG. 3 is an end view of the two-zone countercurrent smelter depicted in FIG. 2.

FIG. 3 is an end view of smelter 2 showing a V-shaped hearth 50 to provide a reasonable bath depth for 15-25 metric tonnes of liquid metal 4. This bath volume allows the use of a rigid shell 52 to contain the refractory hearth 50 over a six to nine month furnace life. FIG. 3 also shows headers 54, which are used to support the water spray system 18.

MODEL ANALYSIS

A mathematical model has been developed to describe the process for continuously making iron or semi-steel (<2% C.) in the two-zone countercurrent smelter. The model is comprised of a comprehensive energy and materials balance for each zone and a kinetic model from which the production rate can be calculated. The model illustrates the relationship among the following process variables in each zone: 1) ore addition, 2) coal addition, 3) production rate, 4) carbon in the metal, 5) FeO content of the slag, 6) post combustion ratio, and 7) temperature. The model is capable of optimizing the process, such that there is no excess or deficit heat in either zone. The model also calculates the temperature increase or decrease in each zone if there is a heat deficit or surplus.

The model has two parameters which describe how the process is run:

$$\text{Reduction Ratio } (RR) = \frac{\text{Reduction in the oxidizing zone } (OZ)}{\text{Total reduction}}$$

$$\text{Iron Oxide Ratio } (R\text{ FeO}) = \frac{\% \text{ FeO in reducing zone } (RZ)}{\% \text{ FeO in OZ}}$$

The rate of production is proportional to the FeO content of the slag. If the FeO content of the slag is increased significantly above 5% in a conventional single-zone smelter, the process has unacceptable yield losses, that is, the iron is discarded with the slag. With the two-zone smelter, the FeO content of the slag is high (>5%) in one zone; but the slag flows into the RZ where the FeO content is reduced to acceptable levels. Having high FeO contents in the OZ gives high production rates in that zone. The rate of production also depends on the char in the slag. In the RZ high production rates are obtained by having large quantities of char in the slag.

In the following examples the following assumptions are made: 1) the final FeO content in the slag tapped from the RZ 12 is 5%; 2) the carbon content of the tapped metal out of the OZ 10 is 2%. The carbon content of the metal can vary from carbon saturation (approximately 5%) down to 0.5% C. At carbon contents less than about 0.5% the rate of reduction of FeO from the slag, and, consequently the reduction rates, too, will be lower. Varying the carbon between 5 to 0.5% will not significantly affect mass balance or production rate. The FeO content in the RZ can also vary. Higher FeO contents in the RZ will increase the production rate but increase the ore required, reducing the yield for the process.

Case 1

Case 1 assumes the rate constants are equal in each zone and are those for single-zone smelters. The temperature is 1500° C., and the only heat transfer across the zones is by the slag 6 or metal 5. Therefore, the process is optimized, requiring no heat transfer, other than by slag and metal, from one zone to the other. The addition rates of the coal, iron ore, and oxygen to each zone are such as to achieve and maintain a total thermal balance in the smelter.

The post combustion ratio (PCR), defined as $$PCR = \frac{\% \ CO_2 + \% \ H_2O}{\% \ CO_2 + \% \ CO + \% \ H_2O + \% \ H_2} \times 100,$$

is assumed to be 50%, and the amount of post combustion energy transferred to the bath (i.e., the heat transfer efficiency (HTE)) is 85%.

Figure 4:
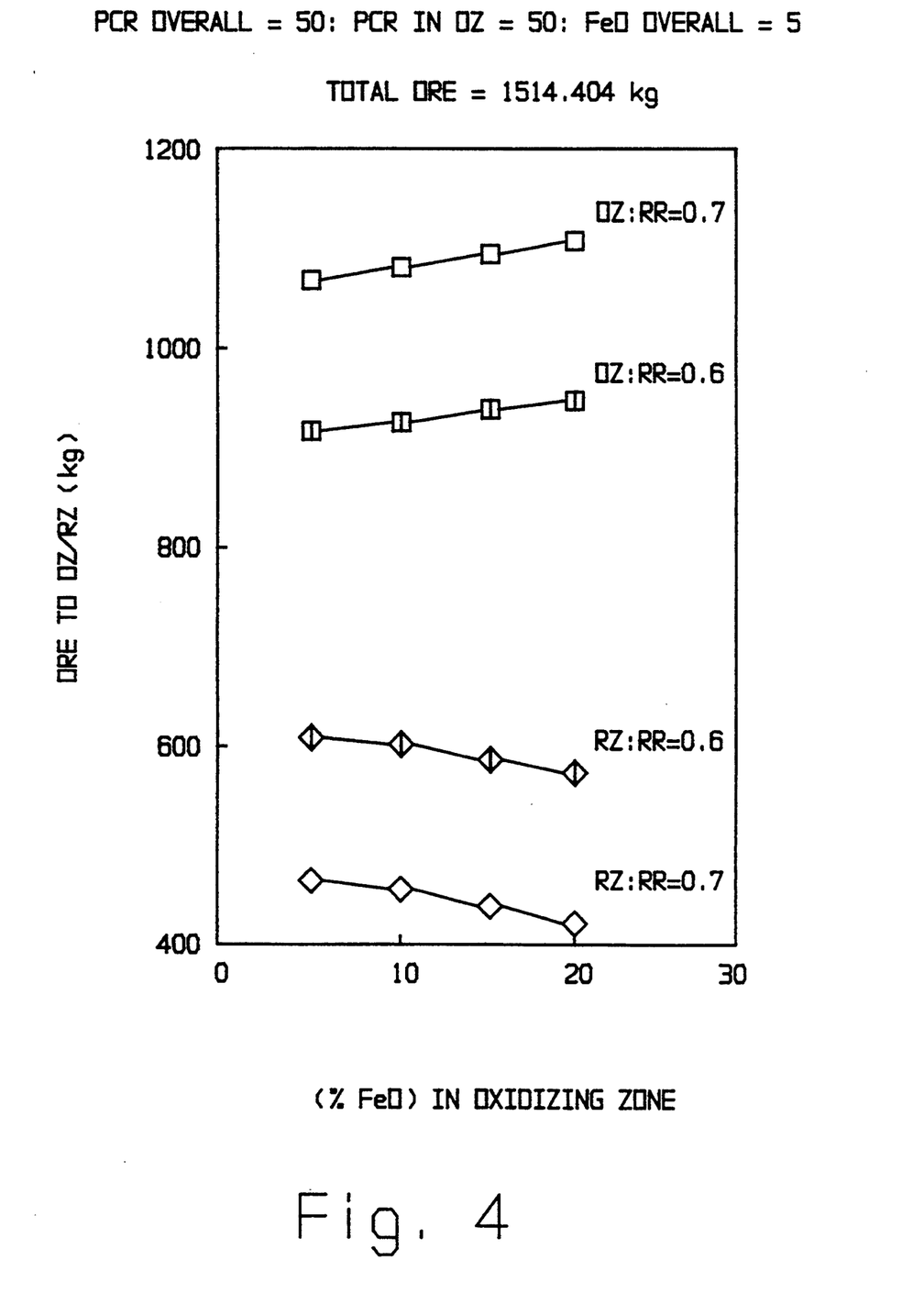
FIGS. 4 through 8 are graphs of model data for the two-zone countercurrent smelter of the present invention.
Figure 5:
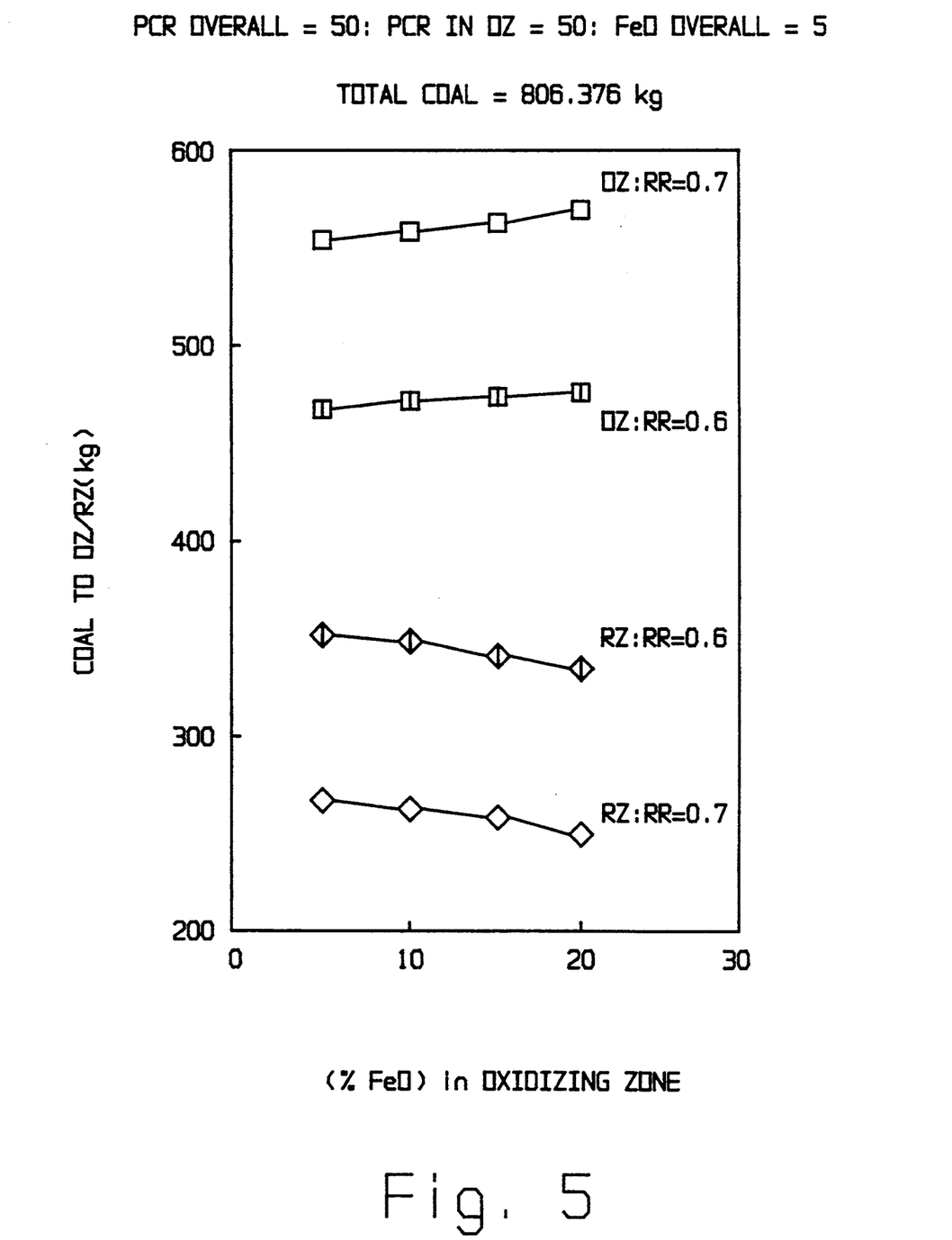

FIG. 4 shows the amount, in kilograms, of ore (prereduced to FeO) to be added to the OZ 10 per tonne (1000 kg) of metal to be produced for RR=0.6 and for RR=0.7, as a function of % FeO in the OZ. Shown in FIG. 5 is the coal addition required for each zone.

The model is also capable of calculating the amounts of oxygen and lime (CaO) required. The model indicates how the process should be run and indicates it is possible to run it in such a way as to not require excessive heat transfer.

Of particular importance is the production rate achieved in the two-zone smelter versus a single-zone smelter of equal size. The comparison is for a single-zone smelter with a cross-sectional area of two square meters ($2m^2$) versus a two-zone smelter with each zone one square meter. As indicated in Table I, the production rate for a two-zone smelter is 75% to 125% higher than for a single-zone, or conventional, smelter of similar size.

TABLE 1

Production rates for a single-zone smelter and a two-zone smelter of similar size with a bath area of two square meters as a function of operating variables for Case 1.

| % FeO in OZ | RR | Char in slag, kg | Production Rates Single zone (1000 kg/hr) | Production Rates Two zone (1000 kg/hr) |
|---|---|---|---|---|
| 10 | 0.6 | 171 | 0.67 | 1.04 |
| 10 | 0.7 | 0 | 0.57 | 0.89 |
| 20 | 0.6 | 857 | 1.16 | 2.04 |
| 20 | 0.7 | 367 | 0.78 | 1.71 |

Case 2

Figure 6:
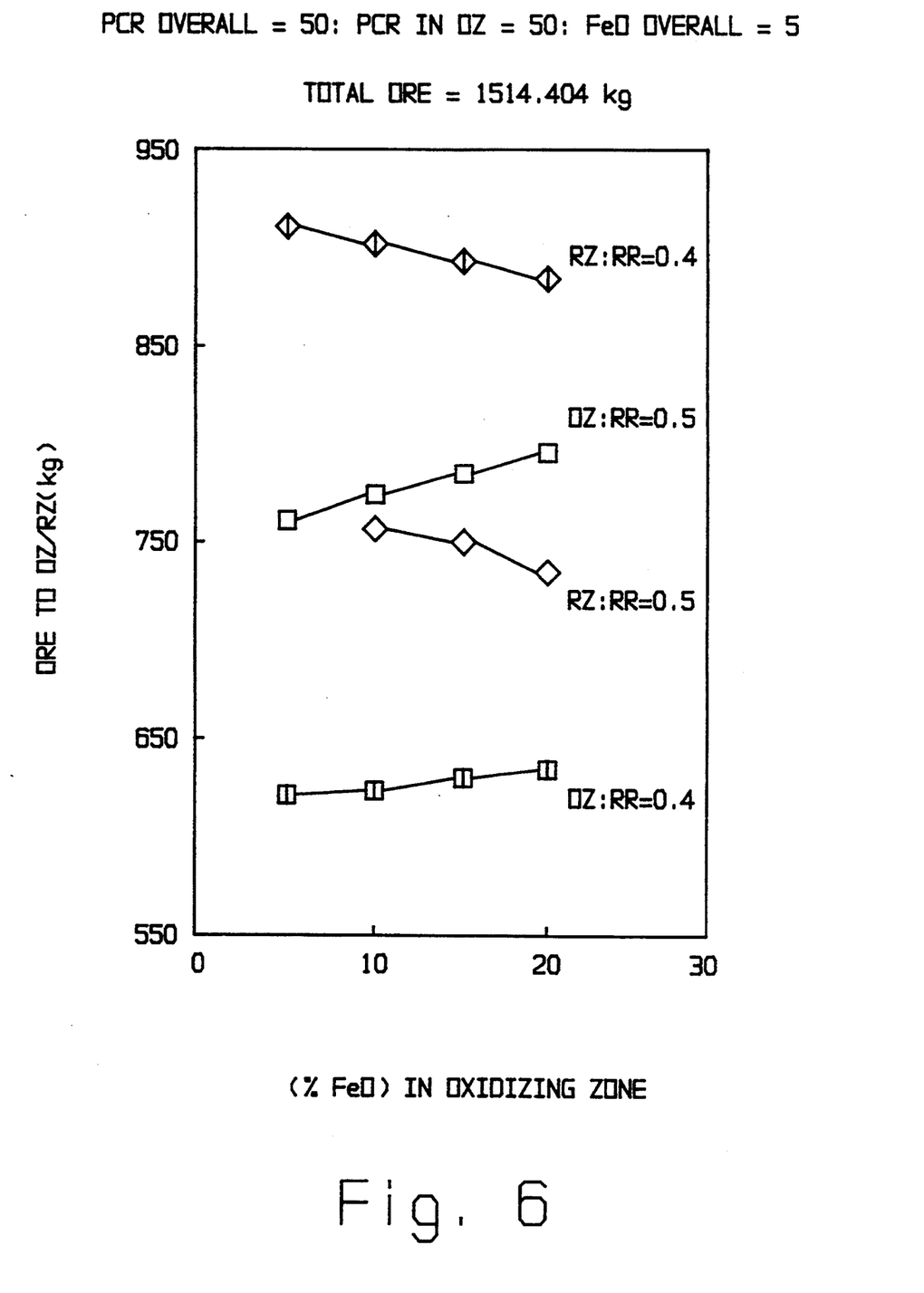
Figure 7:
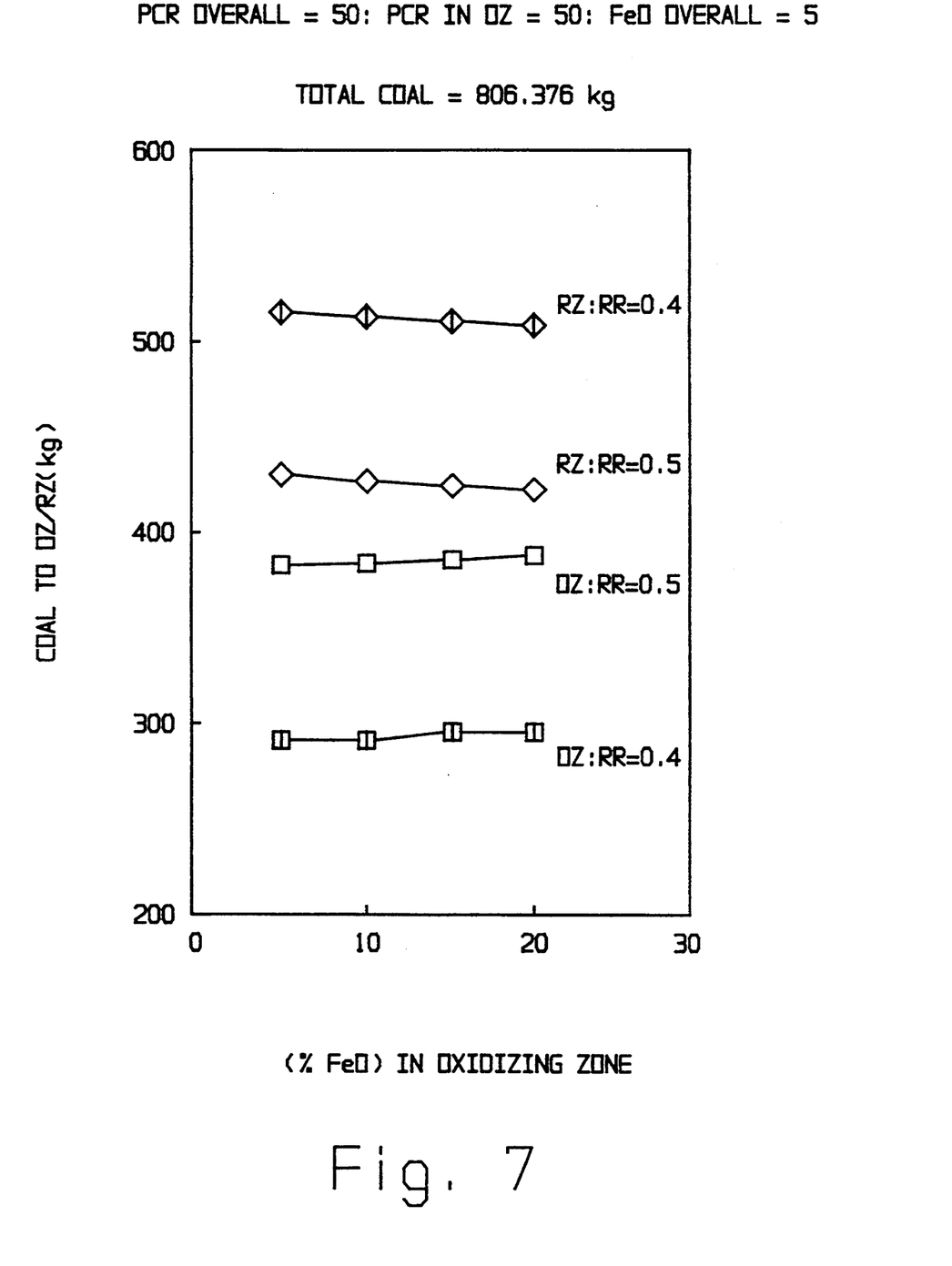

In normal bath smelting, slag-metal mixing is minimized in order to have a high post combustion ratio. With the two-zone smelter, it is possible to increase the amount of slag-metal mixing in the RZ 12, resulting in a faster rate of reduction or production in that zone. However, with increased slag-metal mixing the PCR in that zone is reduced. For the PCR for the entire system to be acceptable for an energy-efficient process, the PCR in the OZ must be increased. The amount of coal and ore required in each zone for the zone to be in thermal balance can be calculated, and those amounts are shown in FIGS. 6 and 7, as in Case 1.

Figure 8:
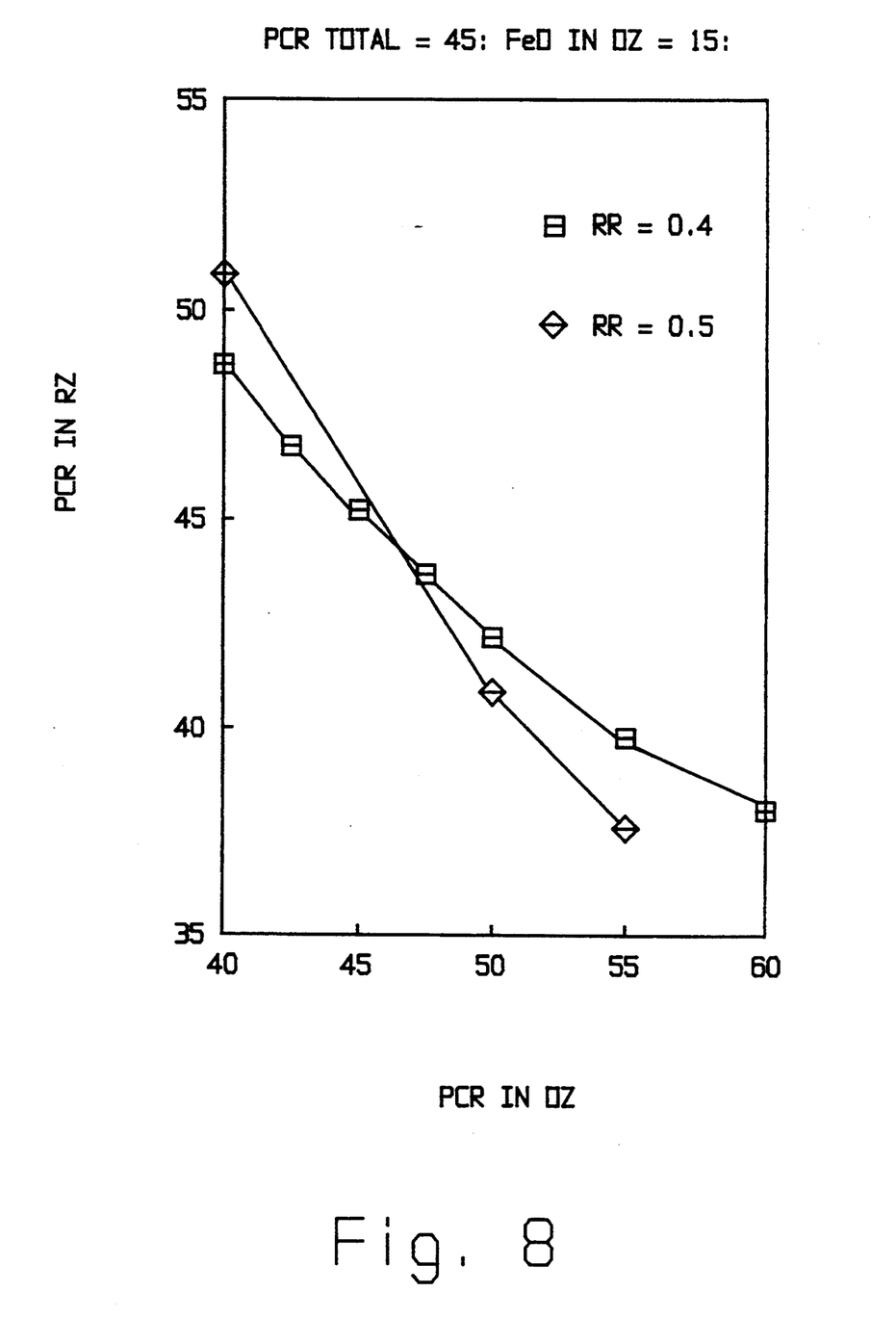

Of particular interest is the PCR required in each zone. In FIG. 8 the PCR for RZ is given as a function of PCR in the OZ, for a total PCR of 45% and RRs of 0.4 and 0.5. For example, if slag-metal mixing is increased in the RZ, such that the PCR in that zone is 38%, then the PCR in the OZ must be 60%.

The most important result of operating the reactor in this manner is the increased production rate. In this case, the rate of the slag-metal reaction in the OZ is that for a single-zone smelter, while the rate in the RZ is three times higher, due to better slag-metal mixing. In Table 2 the production rates for a 2m² single-zone and a similar size two-zone smelter operating in the mode described by Case 2 are presented. In both cases the feed material is ore prereduced to FeO, and the tapped slag contains 5% FeO. In this case, the production rate is about 100% to 180% faster in the two-zone than the single-zone smelter of similar size.

TABLE 2

Production rates for a single-zone and two-zone smelter of similar size with a bath area of two square meters as a function of operating variables for Case 2.

| % FeO in OZ | RR | Char in slag, kg | Production Rates Single zone (1000 kg/hr) | Production Rates Two zone (1000 kg/hr) |
|---|---|---|---|---|
| 10 | 0.4 | 0 | 0.55 | 1.41 |
| 10 | 0.5 | 0 | 0.55 | 1.07 |
| 20 | 0.4 | 1760 | 1.74 | 2.78 |
| 20 | 0.5 | 580 | 1.10 | 2.28 |

We claim:

1. A process for continuously smelting iron or by use of coal to yield molten iron containing from about 0.5 to about 5 weight percent carbon, said process comprising the following steps:
   a) in a horizontal two-zone smelter having two ends each of said two ends corresponding with a zone, establishing an iron melt covered by slag;
   b) inducing the slag and the molten iron to flow countercurrently to one another by using gravity to induce the molten iron flow and the slag toward opposite ends of the smelter;
   c) in a reducing zone of the smelter that contains the end toward which the slag flows and maintaining conditions more conducive to the reduction of iron oxide than are present elsewhere in the smelter;
   d) in an oxidizing zone of the smelter that contains the end toward which the molten iron flows and maintaining conditions more conducive to the oxidation of carbon than are present in the reducing zone;
   e) substantially continuously or semi-continuously tapping the slag from the reducing zone end of the two-zone smelter;
   f) substantially continuously or semi-continuously tapping the molten iron from the oxidizing zone end of the two-zone smelter; and
   g) substantially continuously or semi-continuously adding to both the reducing and the oxidizing zone in the two-zone smelter iron ore, coal, oxygen, and flux at addition rates sufficient to (i) keep the molten iron in the reducing zone substantially saturated with carbon, (ii) maintain in the slag being tapped an FeO content of about 5 weight percent or less, (iii) maintain in the molten iron being tapped a carbon content of about 0.5 to 5 weight percent, and (iv) induce a concurrent flow of said molten iron to said slag.

2. The process of claim 1 wherein the two-zone smelter includes a slag dam that partially separates the reducing zone from the oxidation zone and impedes the backflow of the slag from the reducing zone to the oxidizing zone, while permitting the net rate of flow of the slag from the oxidizing zone to the reducing zone to substantially equal the net rate of slag production in the oxidizing zone.

3. The process of claim 2 wherein the two-zone smelter includes a dam submerged in the iron melt that impedes the backflow of the molten iron from the oxidizing zone to the reducing zone, while permitting the net rate of flow of the molten iron from the reducing zone to the oxidizing zone to substantially equal the net rate of molten iron production in the reducing zone.

4. The process of claim 1 wherein, in step (g), the coal, ore, and oxygen are added to each zone at addition rates that achieve and maintain a total thermal balance in the two-zone smelter, and whereby a post combustion rate (PCR) is defined as:

$$PCR = \frac{\% \, CO_2 + \% \, H_2O}{\% \, CO_2 + \% \, CO + \% \, H_2O + \% \, H_2} \times 100 = 50\%$$

where
$CO_2$ = carbon dioxide
$H_2O$ = water
$CO$ = carbon monoxide
$H_2$ = hydrogen gas.

5. The process of claim 1 wherein, in step (g), the coal, ore, and oxygen are added to each zone at addition rates that achieve and maintain a thermal balance in each of the two zones.

6. The process of claim 3 wherein, in step (g), the coal, ore, and oxygen are added to each zone at addition rates that induce gravity to cause said flow of molten iron from the reducing zone to the oxidizing zone to substantially equal the net rate of molten iron production in the reducing zone.

7. The process of claim 6 wherein, in step (g), the coal, ore, and oxygen are added to each zone at addition rates that achieve and maintain a total thermal balance in the smelter, and whereby a post combustion rate (PCR) is defined as:

$$PCR = \frac{\% CO_2 + \% H_2O}{\% CO_2 + \% CO + \% H_2O + H_2} \times 100 = 50\%$$

where
CO$_2$=carbon dioxide
H$_2$O=water
CO=carbon monoxide
H$_2$=hydrogen gas.

8. The process of claim 7 wherein, in step (g), the coal, ore, and oxygen are added to each zone at addition rates that achieve and maintain a thermal balance in each of the two zones.

9. The process of claim 4 wherein, in step (b), inert gas or oxygen is jetted at a downward lateral angle against the slag from the oxidizing end of the two-zone smelter, breaking up some of the slag in the oxidizing zone into a spray which passes over the slag dam.

10. The process of claim 8 wherein, in step (b), inert gas or oxygen is jetted at a downward lateral angle against the slag from the oxidizing end of the smelter, breaking up some of the slag in the oxidizing zone into a spray which passes over the slag dam.

11. The process of claim 5 wherein, in step (b), inert gas or oxygen is jetted at a downward lateral angle against the slag from the oxidizing end of the two-zone smelter, breaking up some of the slag in the oxidizing zone into a spray which passes over the slag dam.

12. A two-zone smelter for continuously smelting iron ore, by use of coal, to yield molten iron containing from about 0.5 to about 5 weight percent carbon, said smelter comprising:

an enclosed, horizontally elongated, refractory-lined vessel having an oxidizing zone at one end and a reducing zone at the opposite end, said vessel having side walls, end walls, a top, and a bottom;

a slag dam partially dividing the vessel into the two zones;

a metal bath dam, positioned under the slag dam, said metal bath dam having an opening therein sufficiently large to allow molten iron to flow therethrough;

a liquid metal tap located either in the end wall in the oxidizing zone of the vessel, near the bottom, or in the bottom of the vessel, near said end wall;

a slag tap in the end wall in the reducing zone of the vessel, said slag tap being at a higher elevation than said liquid metal tap;

means for adding particulate solids to each zone of the vessel without the escape of gases from the vessel; and means for blowing oxygen into each zone of the vessel.

13. The two-zone smelter of claim 12 including means for jetting inert gas or oxygen into the vessel at a downward lateral angle from the oxidizing end of the vessel with sufficient volume and force to break up some of the slag in the oxidizing zone of the vessel, when the vessel is in use and the slag is at the level of said slag tap, into spray which passes over the slag dam.

14. The smelter of claim 12 wherein the two-zone slag dam is made of copper and contains cooling channels through which a liquid coolant can be circulated.

15. The smelter of claim 13 wherein the two-zone slag dam is made of copper and contains cooling channels through which a liquid coolant can be circulated.

* * * * *